J. MITCHELL AND J. C. G. COSSEY.
COUPLING FOR RAILWAY AND LIKE VEHICLES.
APPLICATION FILED APR. 26, 1921.

1,431,833.

Patented Oct. 10, 1922.

Inventors
John Mitchell
John C. G. Cossey

By James L. Norris
Attorney

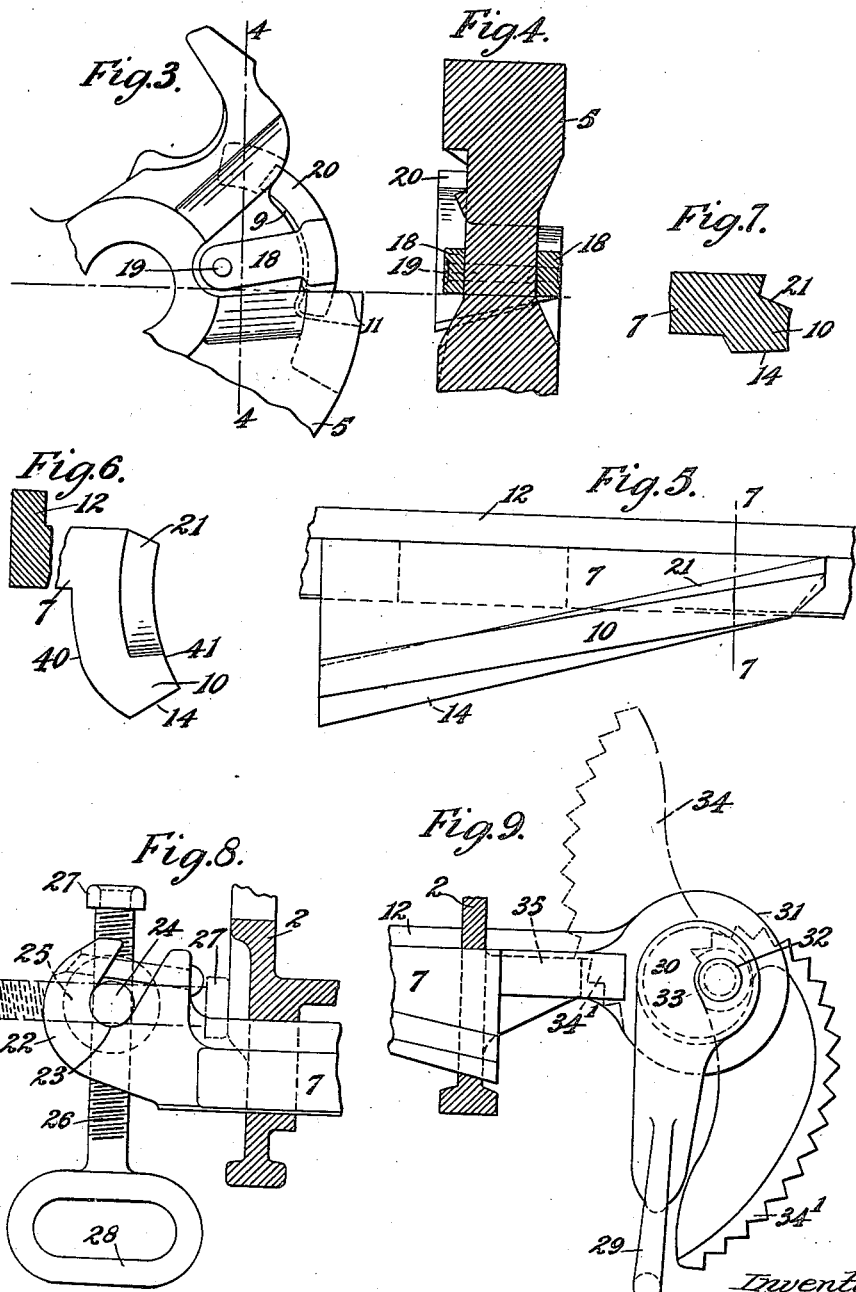

Patented Oct. 10, 1922.

1,431,833

UNITED STATES PATENT OFFICE.

JOHN MITCHELL AND JOHN CECIL GEORGE COSSEY, OF LONDON, ENGLAND.

COUPLING FOR RAILWAY AND LIKE VEHICLES.

Application filed April 26, 1921. Serial No. 464,503.

*To all whom it may concern:*

Be it known that we, JOHN MITCHELL and JOHN CECIL GEORGE COSSEY, both subjects of the King of Great Britain, residing in London, England, have jointly invented certain new and useful Improvements in Couplings for Railway and like Vehicles, of which the following is a specification.

In the application for U. S. Letters Patent of Henry Goold-Adams and John Mitchell, Serial No. 451,179, coupling devices for railway and like vehicles are described of the type in which a revolving disc hook is locked in the coupled position by a spring actuated transverse locking bar which engages in a suitably disposed recess in the periphery of the disc. In the arrangement described in this prior specification a wedge shaped surface provided on the locking bar engages in the locking position in the recess in the disc hook and, under the action of the constantly acting spring force, is automatically drawn inwards, when any looseness due to wear or other causes occurs in the working parts and thereby causes a slight further rotation of the disc hook which always maintains the coupler heads in close contact.

The uncoupling is effected by withdrawing the locking bar until a recess in the bar is opposite the disc hook which can then rotate to its normal uncoupled position.

A latch pivoted in the recess of the disc hook falls by gravity when the locking bar is withdrawn into the uncoupling position in which it acts as a stop preventing the bar from again moving into the coupling position under the action of the spring until the disc hook has been again rotated by the action of a shackle of the approaching vehicle, and the latch has been lifted by an inclined surface on the locking bar.

In this prior arrangement the latch was raised by the incoming locking bar by an amount depending upon the position of the bar at any time as it was drawn inward by the spring to take up any play in the working parts. According to the present invention the latch is raised by an inclined ledge on the locking bar always to the same position, so that a smaller recess is provided for the movement of the pivoted latch with a consequent increase in the strength of the disc hook, while at the same time it is rendered impossible for the latch to fall so far that the incoming locking bar might ride over instead of slide under it.

The surfaces of the locking bar engaging in the disc hook are of helical formation, so that as the bar is withdrawn the disc is rotated in the uncoupling direction and as the bar is inserted the disc is rotated in the opposite direction.

Means are provided for facilitating the withdrawal of the locking bar and improvements in other details of construction are described below with the aid of the accompanying drawings in which—

Fig. 3 is a side elevation on a larger scale of part of the disc hook, showing the latch, Fig. 4 is a section on the line 4—4 of Fig. 3, Fig. 5 is a part plan, Fig. 6 an end view on an enlarged scale of the locking bar and Fig. 7 a section on the line 7—7 of Fig. 5.

Fig. 8 shows a device for withdrawing the locking bar and

Fig. 9 is a modified device for this purpose.

Figure 1:
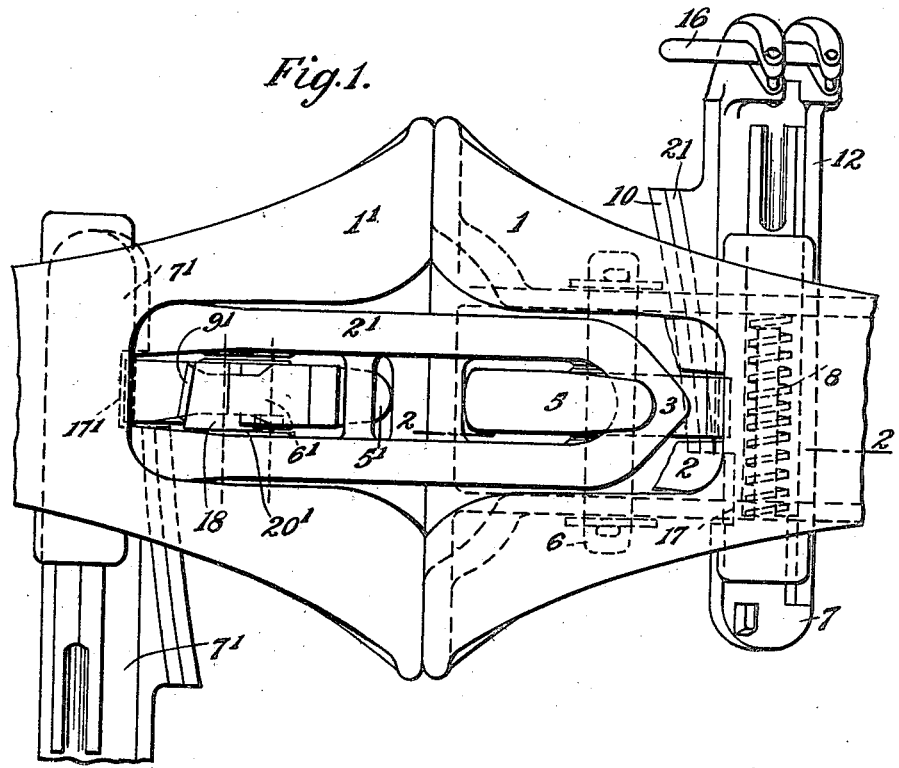
Fig. 1 is a plan of the coupling device.
Figure 2:
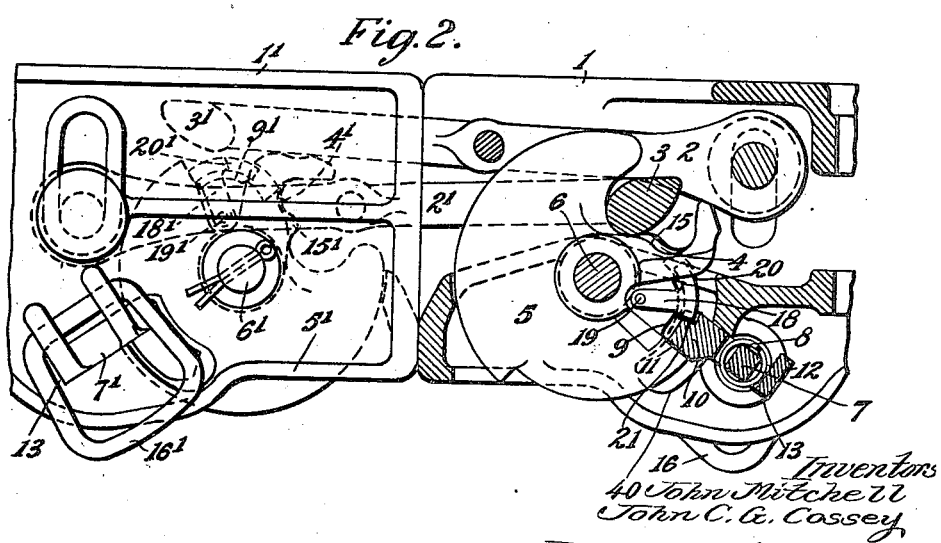
Fig. 2 is a side elevation partly in section on the line 2—2 of Fig. 1.

The coupler heads 1, 1' are shown in Figs. 1 and 2 in the locked position, the hooked end 3 of the shackle 2' having engaged in a recess 4 provided in the disc 5 which is pivoted at 6, the other shackle 2 lying on the shackle 2'. The disc 5 has been rotated by the shackle 2' from a position similar to that occupied by the disc 5' until it has reached the position shown in which the locking bar 7 has, under the action of a spring 8, entered a recess 9 in the disc 5, a wedge shaped portion 10 of the locking bar engaging with the abutting surfaces 11 of the recess 9 and a portion 12 sliding in guiding slots 13 provided in the coupler head 1. The part 10 of the locking bar is formed as a portion of a helix and the surface 11 with which it engages is similarly formed so that as the bar 7 is moved inwards the disc 5 is rotated in the clockwise direction and as the bar is withdrawn the disc is rotated in the anti-clockwise direction into its uncoupled position. One side of the wedge 10 is offset as described in application for U. S. Letters Patent Serial No. 451,179, above referred to, and as shown at 14, so that as the disc is rotated under the action of the wedge the surfaces of the bar and of the wall of the recess 9 may abut in radial planes. The faces 40 and 41 (Fig. 6) of the bar are arcs of circles subtended from the centre of the disc hook.

The portion of the disc hook which engages with the point of the incoming shackle is provided with a rounded projection 15 or 15′ on which the lower portion of the shackle rests, in order that, when the disc has rotated under the force of impact through an angle which has advanced the projection beyond the axis of the pin 6 or 6′ to which the disc is secured, a torque is exerted on the disc due to part of the weight of the two shackles, this torque ensuring the full rotation of the disc into the coupling position, if the point of the shackle has been blunted, or even if it is entirely absent.

In the example shown in Figs. 1 and 2 the locking bars are provided in known manner with handles 16, 16′ by which the bars can be drawn outwards until a recess 17 or 17′ is opposite the disc, which is then free to rotate into the uncoupled position.

A latch 18 is pivoted at 19 in the recess 9 and carries an extension 20 projecting slightly beyond the face of the disc 5 which is sloped inwardly at this part. As the locking bar 7 is drawn inwards an inclined ledge 21 on the bar engages with the under side of the latch and raises it so that the bar can slide under the latch. This ledge is inclined so that the latch is lifted by the same amount independently of the extent to which the locking bar may have been advanced by the spring 8.

In the construction shown in application for U. S. Letters Patent Serial No. 451,179 the latch rested on a flat surface of the bar and the recess was necessarily of sufficient depth to allow for the gradually increasing angular displacement of the latch as the wedge was drawn inwards.

When the bar 7 is withdrawn the latch falls by gravity and the extension 20 prevents the bar from being again forced by the spring 8 into the coupling position until the disc hook 5 has rotated sufficiently to remove the recess 9 from opposite the bar.

Fig. 8 shows an arrangement in which a mechanical advantage is gained for the purpose of withdrawing the locking bar.

The bar 7 is provided with a forked end 22 in which bearings 23 support trunnions 24 of a nut 25. A screw threaded bolt 26 engages in the nut 25 and the end 27 of the bolt engages against the coupler head when the bolt is turned from the position shown in full lines to that indicated by the broken lines. In this latter position the rotation of the handle 28 of the bolt causes the withdrawal of the locking bar 7.

In the modification shown in Fig. 9 a handle 29 terminates in a disc 30 rotating freely in a circular head 31 provided at the outward end of the locking bar 7. The disc 30 has an eccentrically arranged hole 32 in which a pin 33 is mounted.

A pawl 34 in the form of a toothed segment of a circle is loosely mounted on the pin 33, the teeth 34 of the pawl resting on a projection 35 of the coupler head, as shown in broken lines. As the handle is raised through 90°, the locking bar is withdrawn through a distance corresponding to the eccentricity of the pin hole 32; by repeated actuations of the handle, the locking bar is withdrawn to its full extent in which the segmental pawl is released from the coupler head and falls into the position shown in the full lines. The pin 33 and pawl 34 may be formed in one piece.

Having thus described the nature of the said invention and the best means we know of carrying the same into practical effect, we claim:—

1. A coupling for railway and like vehicles comprising a rotatable disc hook, said disc hook having a recess therein, a locking bar, a wedge shaped surface on said bar, spring actuated means automatically operating to insert said wedge surface into said recess when said disc is in the coupling position, a latch pivoted in said recess, an inclined surface on said locking bar adapted to raise the latch by a constant amount as it enters said recess.

2. A coupling for railway and like vehicles comprising a rotatable disc hook, said disc hook having a recess therein, a locking bar, a wedge shaped surface on said bar, spring actuated means automatically operating to insert said wedge surface into said recess when said disc is in the coupling position, a latch pivoted in said recess, an inclined surface on said locking bar adapted to raise the latch by a constant amount as it enters said recess, a terminal extension on said latch which in the dropped position of the latch lies in front of the locking bar.

3. A coupling for railway and like vehicles comprising a rotatable disc hook, said disc hook having a recess therein, a locking bar, a wedge shaped surface on said bar, spring actuated means automatically operating to insert said wedge surface into said recess when said disc is in the coupling position, a latch pivoted in said recess, an inclined surface on said locking bar adapted to raise the latch by a constant amount as it enters said recess, and means for facilitating the withdrawal of the locking bar in case it is jammed.

4. A coupling for railway and like vehicles comprising a rotatable disc hook, said disc hook having a recess therein, a locking bar, a wedge shaped surface on said bar, spring actuated means automatically operating to insert said wedge surface into said recess when said disc is in the coupling position, a latch pivoted in said recess, an inclined surface on said locking bar adapted to raise the latch by a constant amount as it enters said recess, and means for facilitating the withdrawal of the locking bar in case it is jammed, the said means comprising a head on said locking bar, a disc engaging with the interior of said head, a pin eccentrically mounted on said disc, a segmental pawl on said pin and a handle on said disc.

In testimony whereof we have signed our names to this specification.

JOHN MITCHELL.
JOHN CECIL GEORGE COSSEY.